(12) United States Patent
Zambetti, Jr. et al.

(10) Patent No.: US 11,593,592 B2
(45) Date of Patent: Feb. 28, 2023

(54) INTELLIGENT PAYMENT PROCESSING PLATFORM SYSTEM AND METHOD

(71) Applicant: Accenture Global Solutions Limited, Dublin (IE)

(72) Inventors: Humberto Zambetti, Jr., Sao Bernardo do Campo (BR); Claudio Narcizo Gomes, Jr., Cotia (BR); Marcia Souza dos Santos, Sao Paulo (BR)

(73) Assignee: Accenture Global Solutions Limited, Dublin (IE)

( * ) Notice: Subject to any disclaimer, the term of this patent is extended or adjusted under 35 U.S.C. 154(b) by 297 days.

(21) Appl. No.: 16/890,681

(22) Filed: Jun. 2, 2020

(65) Prior Publication Data

US 2021/0374479 A1 Dec. 2, 2021

(51) Int. Cl.
| | |
|---|---|
| *G06F 40/247* | (2020.01) |
| *G06K 9/62* | (2022.01) |
| *G06N 20/00* | (2019.01) |
| *G06Q 10/0631* | (2023.01) |
| *G06F 16/33* | (2019.01) |

(52) U.S. Cl.
CPC ....... *G06K 9/6262* (2013.01); *G06F 16/3344* (2019.01); *G06F 40/247* (2020.01); *G06N 20/00* (2019.01); *G06Q 10/0631* (2013.01)

(58) Field of Classification Search
CPC . G06F 40/247; G06K 9/6262; G06Q 10/0631
See application file for complete search history.

(56) References Cited

U.S. PATENT DOCUMENTS

| | | | |
|---|---|---|---|
| 2009/0292599 A1* | 11/2009 | Rampell | G06Q 30/0211 |
| | | | 705/14.23 |
| 2017/0278085 A1* | 9/2017 | Anderson | G06Q 20/405 |
| 2017/0345079 A1* | 11/2017 | Rangan | G06F 16/951 |
| 2018/0074931 A1* | 3/2018 | Garcia | G06F 11/3409 |
| 2021/0012102 A1* | 1/2021 | Cristescu | G06F 40/284 |

* cited by examiner

*Primary Examiner* — Andrea C Leggett
(74) *Attorney, Agent, or Firm* — Plumsea Law Group, LLC

(57) ABSTRACT

A system and method of automating payment processing is disclosed. Payment documents can be processed using an array of tools including artificial intelligence integrated with the end-user's own ERP architecture. The proposed implementations maintain a logical segregation of the documents, which may include the processing of receipts, validation of documents against ERP information, tax analysis, posting of documents, as well as real-time monitoring and support of settlement and accounts payable operations. Embodiments of this approach utilize enhanced optical character recognition (OCR) techniques in conjunction with robotic process automation (RPA) and Machine Learning to produce a platform capable of enabling these processes to run end-to-end with little to no human intervention or error.

20 Claims, 11 Drawing Sheets

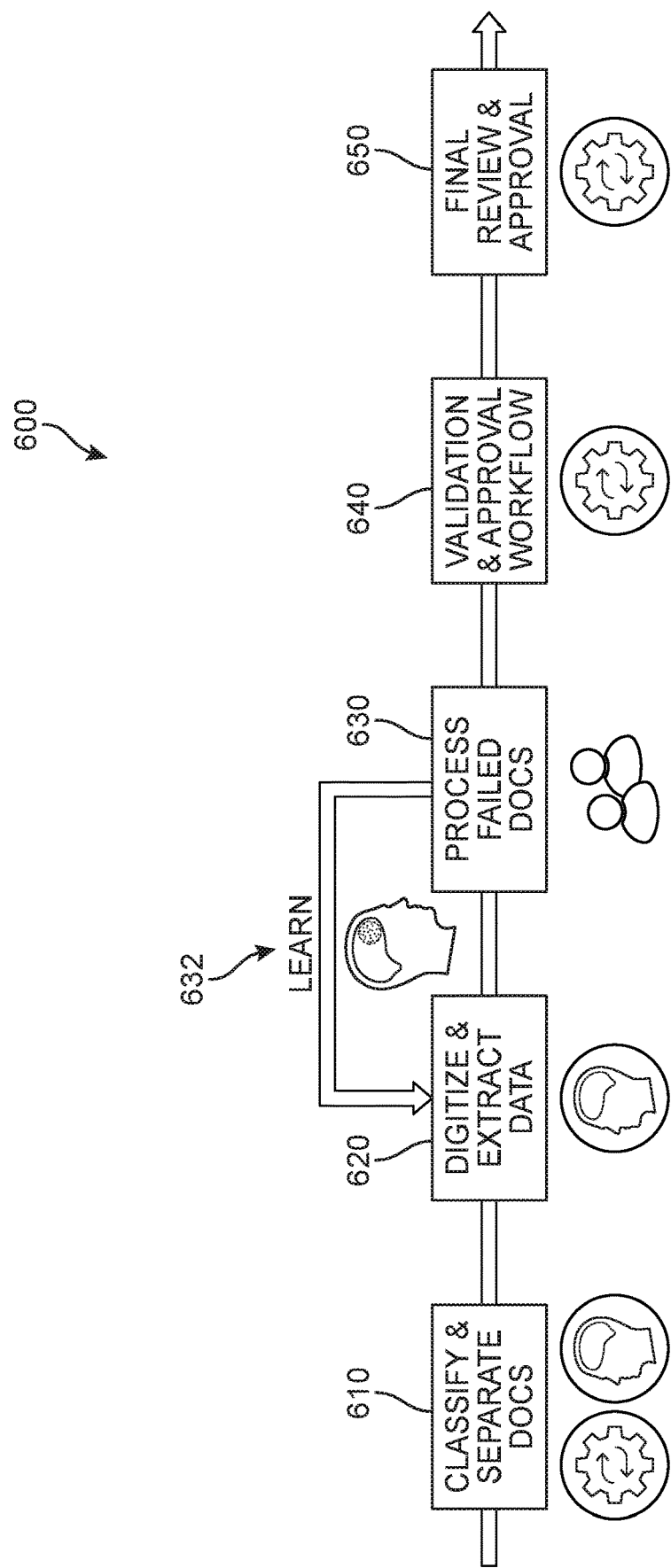

| FIELDS PROCESSED: |
|---|
| - INVOICE NUMBER |
| - INVOICE ISSUE DATE |
| - SUPPLIER'S NATIONAL REGISTRY OF LEGAL ENTITIES |
| - SUPPLIER'S CORPORATE NAME |
| - SUPPLIER ADDRESS |
| - SUPPLIER COUNTRY |
| - SUPPLIER STATE |
| - BORROWER'S CORPORATE NAME |
| - BORROWER'S NATIONAL REGISTRY OF LEGAL ENTITIES |
| - BORROWER ADDRESS |
| - BORROWER COUNTRY |
| - BORROWER STATE |
| - SERVICES BREAKDOWN (ORDER NUMBER, ITEM) |
| - TOTAL INVOICE AMOUNT |
| - DESCRIPTION OF THE NATURE OF THE OPERATION |
| - TAX AMOUNT AND RATE |

FIG. 7

BACKOFFICE
HOME / BACKOFFICE MANAGEMENT

FILTERS: ⟲ CLEAR FILTERS ⊘  | RECORD DATE FROM ▢ TO ▢ | DATE OF LAST STATUS UPDATE FROM ▢ TO ▢

INVOICE TYPE: SELECT ▽ | ISSUE TYPE: SELECT ▽ | NOTE VALUE FROM R$ 0,00 TO R$ 0,00

{ 910 }   { 920 }

SEARCH [    ]    COPY | PRINT

PENDING VALIDATION – ITEM LISTING
FILTERS:
SHOW [10 ▽] RECORDS
PRESENTING 1 TO 5 OF 152 RECORDS

| ITEM NUMBER | RECORD NUMBER | SLA (DAYS) | DATABASE SLA | RECORD DATE | SUBMISSION DATE | SUPPLIER |
|---|---|---|---|---|---|---|
| 05369 | 4297626 | 6 | 26/09/2017 | 25/09/2017 | 4/07/2017 | COMMERCIAL SERVICES LTD |
| 87664 | 4026221 | 6 | 26/09/2017 | 25/09/2017 | 8/11/2016 | PANDA DIGITAL |
| 00163 | 4351240 | 6 | 26/09/2017 | 25/09/2017 | 19/09/2017 | EDUCATION VENDORS |
| 10501 | 4040240 | 6 | 26/09/2017 | 25/09/2017 | 22/11/2016 | SOFTWARE CONSULTANTS |
| 00401 | 4189301 | 6 | 26/09/2017 | 25/09/2017 | 2/12/2016 | COMMERCIAL ELECTRONICS |

PREVIOUS [1][2][3]…[9] NEXT

INTELLIGENT PAYMENT PROCESSING PLATFORM SYSTEM AND METHOD

TECHNICAL FIELD

The present disclosure generally relates to the automation of payment document processing operations. More specifically, the present disclosure generally relates to a system and method for the incorporation of platforms configured to process payment documents.

BACKGROUND

Many businesses may be required by law to send electronic invoices (i.e., e-Documents) to the government for approval for transactions. The number of individual countries having regulations, which require different technical requirements, has increased in recent years. These technical requirements could include a wide range of format requirements, authentication requirements, legal requirements, etc. For example, a business operating in a particular country may create an invoice when doing business with another entity. When generating this invoice, the business entity may be required by the local government to conform the invoice to specific technical or formatting requirements, which must be managed carefully by the business. Such processes require the business to expend significant resources in order to comply with regulations that can differ from country to country. The process of creating everyday business documents therefore has become a highly technical and time-consuming process. This issue can be particularly burdensome for large, multinational corporations which operate in many different countries, and are required to comply with a wide range of different technical requirements.

Conventional document processing systems typically require numerous manually performed steps requiring different degrees of sophistication. For example, an entity, such as a vendor or supplier, can provide hard copies of documents to an entity (i.e., in either printed or handwritten format) and/or scanned documents. Employees of the entity will update information and perform data entry in the document processing systems based on the received documents. Such manual performance of the steps associated with document processing systems are labor intensive and time consuming. Furthermore, the manual performance of the steps associated with document processing systems is cumbersome, consumes resources (e.g., processing resources, memory resources, and/or the like associated with image recognition systems), is prone to errors or incomplete data entries, and depletes natural resources (e.g., trees used to make paper).

In particular, many business entities receive invoices from their customers or vendors on a regular basis. Maintaining an up-to-date record of such invoices, including their processing and management of payment dates remains challenging. Most of invoice management tasks are manual processes or partially automated processes, typically prone to human error, and do not support scalability. For example, current systems do not automatically detect incoming invoices, nor do they automatically label or classify the invoices. Instead, a user must manually enter details related to the invoice and tag the invoice accordingly. The ability to more efficiently and effectively process invoices and record data with minimal human intervention would greatly enhance the productivity and capacity of such systems.

There is a need in the art for a system and method that addresses the shortcomings discussed above.

SUMMARY

A system and method for automating and improving invoice processing outcomes that is in compliance with the defined norms and requirements mandated by a regulatory body is disclosed. The system and method solve the problems discussed above by providing an intelligent platform that is designed to streamline document classification and invoice processing for business entities. The platform is designed to operate with little to no human intervention. The automated architecture applies dynamic machine learning algorithms configured to update its own specialized knowledge base for continuously improving data validation.

In one aspect, the disclosure provides a method of automating some or all aspects of payment document processing. The method includes receiving, from a first supplier, a first document for a first transaction, and automatically extracting a first data set from the first document, the first data set including at least a first data value held by a first field. The method also includes automatically assessing, via a machine learning RPA bot, a validity of the first data value by reference to a synonym database including a plurality of records, each record including one data field and one or more data values that are approved for entry under the one data field. In addition, the method includes automatically determining that the first data value is valid for the first data field, and storing the validated first data value as part of a supplier record for the first supplier.

In another aspect, the disclosure provides a system for automating some or all aspects of payment document processing. The system includes a processor and machine-readable media including instructions which, when executed by the processor, cause the processor to receive, from a first supplier, a first document for a first transaction, and also to automatically extract a first data set from the first document, the first data set including at least a first data value held by a first field. The instructions further cause the processor to automatically assess, via a machine learning RPA bot, a validity of the first data value by reference to a synonym database including a plurality of records, each record including one data field and one or more data values that are approved for entry under the one data field. In addition, the instructions cause the processor to automatically determine that the first data value is valid for the first data field, and to store the validated first data value as part of a supplier record for the first supplier.

In another aspect, the disclosure provides a system that includes one or more computers and one or more storage devices storing instructions that are operable, when executed by the one or more computers, to cause the one or more computers to receive, from a first supplier, a first document for a first transaction, and to automatically extract a first data set from the first document, the first data set including at least a first data value held by a first field. The instructions also cause the one or more computers to automatically assess, via a machine learning RPA bot, a validity of the first data value by reference to a synonym database including a plurality of records, each record including one data field and one or more data values that are approved for entry under the one data field. Furthermore, the instructions cause the one or more computers to automatically determine that the first data value is valid for the first data field, and to store the validated first data value as part of a supplier record for the first supplier.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 is a schematic flow diagram of a data extraction and validation process, according to an embodiment;

FIG. 7 is a table presenting examples of fields or data structures processed by machine learning bots during data validation, according to an embodiment;

FIGS. 9 and 10 are examples of a back-end user interface, according to an embodiment.

DESCRIPTION OF EMBODIMENTS

Figure 1:
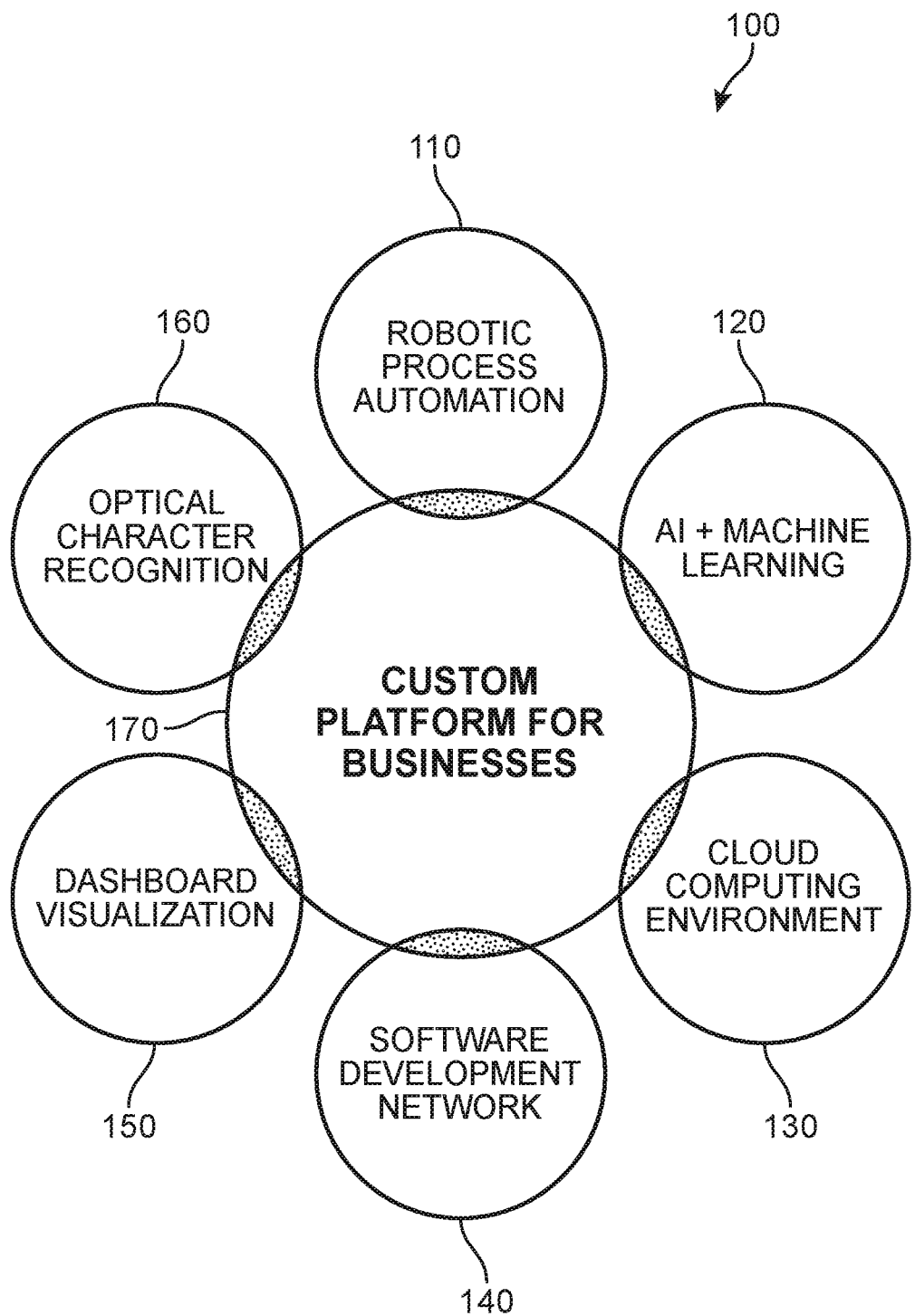
FIG. 1 is a schematic diagram of an embodiment of a payment processing platform.

A wide range of businesses rely on enterprise resource planning (ERP) computing architecture type systems to electronically manage and coordinate business resources, information, and functions. However, document processing tasks remain labor-intensive. For example, the contents of many of the documents must be analyzed manually in order to determine if the document complies with any technical or government-mandated processes associated with such a document.

The proposed systems and methods describe an intelligent augmentation of such document processing operations. Specifically, payment documents, as will be described below, can be processed using an array of tools including artificial intelligence integrated with the client's own ERP architecture. The proposed implementations maintain a logical segregation of the documents, which may include the processing of receipts, validation of documents against ERP information, tax analysis, posting of documents, as well as real-time monitoring and support of settlement and accounts payable operations. Embodiments of this approach utilize enhanced optical character recognition (OCR) techniques in conjunction with robotic process automation (RPA) and Machine Learning to produce a platform capable of enabling these processes to run end-to-end with little to no human intervention or error. The platform offers a solution that automates and digitalizes document processing systems, such as but not limited to invoice processing systems, contract processing systems, remittance processing systems, etc., resulting in a significant reduction or elimination of manual data entry, increased accuracy, conservation of computing resources, and a lowered overall cost.

As more business processes become digitized, the number of vendors offering electronic invoices is increasing. The format of these invoices will vary depending on the systems used to generate them. Such variations present challenges in data collection, often requiring that the information be manually entered into an accounting or ERP system after an invoice has been approved for payment. For example, all businesses have a legal requirement to monitor their financial position and to maintain proper financial accounting records. Financial accounting systems, and the reports and summary information that are generated by such systems, are required by business owners in order to meet their obligations to file documents such as Goods and Services Tax Statements, Business Activity Statements, and Tax Return Statements. Businesses of different types have various requirements for following up on outstanding invoices, reconciling various accounts, registering security interests and the like. Compliance with ever-changing government regulations remains a complex process. Companies must make regular updates to maintain compliance, and must ensure that all of their systems and processes are in order to avoid errors.

The proposed systems and methods are particularly designed to provide significant advantages to businesses operating in regions that have specialized mandates for processing of financial transactions. As one non-limiting example, Brazil now requires a complex level of e-Invoicing and financial reporting that is far more complex than that required by any other country. These mandates are rapidly expanding and continue to spread into a number of business processes, including sales, procurement, supply chain management, human resources and cash flow. The complexities and risks associated with compliance are immense, ranging from audits and fines to complete operational shut downs.

For example, the Brazilian tax authority (SEFAZ) has imposed a defined electronic standard format that all companies must adhere to closely. The "Nota Fiscal Eletronica" (NF-e) format is officially recognized as the sole and only invoice document of record for tax compliance purposes, and encompasses three different kinds of invoices. An NF-e for physical goods is the most commonly utilized invoice, and can also be the most complex, as vendor products cannot leave the warehouse or other center until the approval codes are incorporated into the process (this output is called a "DANF-e"). An NF-e for services refer to invoices managed at the city level within Brazil. Finally, an NF-e for transportation are invoices for freight that must be validated by the buyer and posted in the back-end system and included in the monthly reports to the government.

Thus, the NF-e represents both a legal document and an electronic invoice which contains tax and logistical information in the form of an XML document with a layout defined by the Brazilian government. The NF-e can involve both Business to Government (B2G) communication (requesting authorization of NF-e from tax administration before billing may take place) as well as Business to Business (B2B) communication (sending the authorized NF-e to the customer). In the B2B case for an incoming NF-e, the information provided in the document will lead to certain processing steps having to be performed. In addition to the regular processing of Goods Receipts (GR) and Invoice Receipts (IR), the processing of the XML messages results in additional process steps that are necessary to carry out, such as verifying the authorization of NF-e with the government. Because these documents contain information that fall under many different categories of documents in the ERP system (e.g., purchase order, delivery, goods movement or invoice), in practice they often represent data related or relevant to a combination of different ERP system documents. The proposed systems and methods offer end-users an intelligent system that improves invoice processing outcomes and is in compliance with the defined norms and requirements mandated by a given regulatory body. The systems and methods further offer readily implemented options for integration with the customer's own ERP system and the systems used by government tax authorities.

Referring to FIG. 1, for purposes of introduction, an example of a business process environment ("environment") 100 is depicted. Environment 100 includes a custom enterprise platform 170 that is created by the intersection or application of multiple computing techniques that each offer significant benefits. These include Robotic Process Automation (RPA) 110, AI and Machine Learning 120, cloud computing 130, software development networks 140, application programming interfaces (API) 150, and optical character recognition 160.

To provide further context, RPA 110 can be described as process automation technology that leverages software-implemented robots (also referred to herein as "bots") to perform processes, or portions of processes. In some embodiments, bots include artificial intelligence (AI) features. Some non-limiting examples of AI features include intelligent scheduling, computer vision, language detection, entity recognition, and sentiment analysis. An RPA platform can be provided that includes multiple bots (e.g., tens, hundreds, thousands) executing on hardware systems. In some examples, a bot is deployed using a virtual machine (VM) that is executed on a hardware component (e.g., server). In some examples, multiple VMs, each running an instance of a bot, can be deployed on one or more servers.

RPA offers the use of software to perform high-volume, repeatable tasks on computer systems. More particularly, RPA bots can be configured to capture and interpret existing applications to, for example, process a transaction, manipulate data, trigger responses, and/or communicate with other systems. RPA is distinct from automation processes in that RPA is aware of, and can adapt to changing circumstances, exceptions, and new situations. Once an RPA bot has been trained to capture and interpret the actions of specific processes in existing software applications, the bot performs its assigned tasks autonomously. In some examples, RPA can expedite back-office and middle-office tasks in a wide range of industries, which can include, without limitation, manufacturing, health care, telecom, insurance, finance, procurement, supply chain management (SCM), accounting, customer relationship management (CRM), and human resource management (HRM).

In some examples, RPA can be implemented in organizations that have many different and complicated systems that need to interact together fluidly. For example, when an electronic form from a taxation system is lacking a form field, traditional automation software may flag the form as having an exception, and an employee would then handle the exception by, for example, looking up the missing information and entering it into the form. Once the form was completed, the employee might send it on to payroll so that the information could be entered into, for example, the organization's payroll system. With RPA, however, and continuing with the above example, a bot can be used, which is able to adapt, self-learn, and self-correct, handle exceptions, and interact with the payroll system without human assistance. Furthermore, technologies like presentation-layer automation software—a technology that mimics the steps of a rules-based, non-subjective process without compromising the existing information technology (IT) architecture—are able to consistently carry out prescribed functions, and scale-up or -down to meet demand.

In general, these RPA bots are provided via an RPA platform. Some non-limiting example RPA platforms include Automation Anywhere™, Blue Prism™ and UiPath™. In some examples, an RPA platform provides a set of tools (e.g., bot development tools, bot management tools), libraries, and runtime environments for bots. In some examples, a bot can include one or more data objects, and logic that encodes a process (or portion of a process) that the bot is to perform. A bot interacts with one or more applications (i.e., computer-executable programs) to perform one or more jobs (e.g., processing a set of invoices). In some examples, each job includes one or more transactions (e.g., processing an invoice of the set of invoices), and each transaction can include one or more actions (e.g., entering invoice information into an application). For example, a data object of a bot can be connected to a user interface (UI) of an application (e.g., browser-based HTML interfaces, MS Windows™ interfaces, mainframe terminal interfaces, Java-based interfaces, etc.), and the data object executes one or more actions using the UI. For example, a data object can execute actions to log into an application, enter data, retrieve a result, and log off. In some examples, a data object includes an application model, and one or more actions. For example, the application model is specific to an application that the bot is to interact with, and exposes elements of the UI of the application. Thus, the one or more actions include actions that the data object can perform with the application.

In some embodiments, an RPA platform can provide an application server that functions as a common control point for multiple bots, as well as a database. In some examples, the database functions as a shared repository for the RPA platform, storing code for each bot, work queues of the bots, audit logs, and the like. An RPA platform can also provide platform-specific control and monitoring tools for managing bots, creating dashboards, and the like. Furthermore, there may be multiple RPA platforms provided across multiple enterprises. For example, a first RPA platform can be deployed for a first enterprise, and a second, different RPM platform can be deployed across a second enterprise. As noted above, however, each RPA platform includes platform-specific bots, monitoring, control, and databases. Consequently, each enterprise, and/or third-party operating on behalf of enterprises, is required to be knowledgeable about respective RPA platforms, and implement RPA platform-specific processes, and procedures to effectively, and efficiently manage and control bots on the respective RPA platforms.

Furthermore, embodiments of the proposed systems may run bots that process documents with reference to AI and machine learning (ML) model ("ML model") 120. For example, a specific bot may run from time to time, processing all invoices classified under a "Finalized" status platform 170 and which have not yet been processed by the ML model 120. Each invoice includes a plurality of fields, and each field will generally hold or include a response (i.e., some data value entered into as input corresponding to that field). The bot reviews the fields listed in the invoice. With reference to the ML model 120, the bot is configured to register a new response where the response detected for that field does not yet exist in the response database for the field in question. In other words, in concert with the RPA 110, the ML model 120 can be used to compare some or all fields of an invoice to its own machine learning generated repository of field responses. If the response is novel, a subject matter expert can review the response and decide whether it is a valid input for that field. If the input is recognized as acceptable, the bot adds the response to its machine learning-based database for that field for future reference. This allows the system to learn and evolve and apply the most up-to-date information when identifying an acceptable response that may be provided for that particular field. This process will be discussed in greater detail with respect to FIGS. 2 and 7.

In some embodiments, the platform 170 may be hosted at least in part in cloud computing environment 130 offering ready scalability and security. However, while implementations described herein describe platform 170 as being hosted in cloud computing environment 130, in some implementations, the platform 170 may not be cloud-based (i.e., may be implemented outside of a cloud computing environment) or may be partially cloud-based. The cloud computing environment 130 can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the document processing and/or any other software capable of being provided via cloud computing environment 130, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

As shown in FIG. 1, applications of the platform 170 are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) 150 that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or component management platform may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment (IDE), such as a web-based IDE that is accessible from any device with a web browsing application browser. Some non-limiting examples of such frameworks include Microsoft.NET™, the EMC™ IDE, the Microsoft™ Visual Studios IDE for writing and debugging code, and the Eclipse™ IDE for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

The platform 170 also relies on customized APIs developed and/or supported by software development framework 140 to generate interactive visualization dashboards 150. For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below with reference to FIGS. 8-10.

Furthermore, the platform 170 will make use of a specialized optical character recognition (OCR) engine 160 to generate digitized documents. In some implementations, the OCR engine may include an OmniPage OCR engine, a Google Cloud Vision API OCR engine, Microsoft Azure Computer Vision API OCR engine, an IBM Bluemix OCR engine, and/or the like. In some implementations, the OCR engine may convert the documents into an electronic format (e.g., the digitized documents). Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, identification documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like. Additional information regarding the OCR engine 160 will be provided with reference to FIGS. 5 and 6 below.

Figure 2:
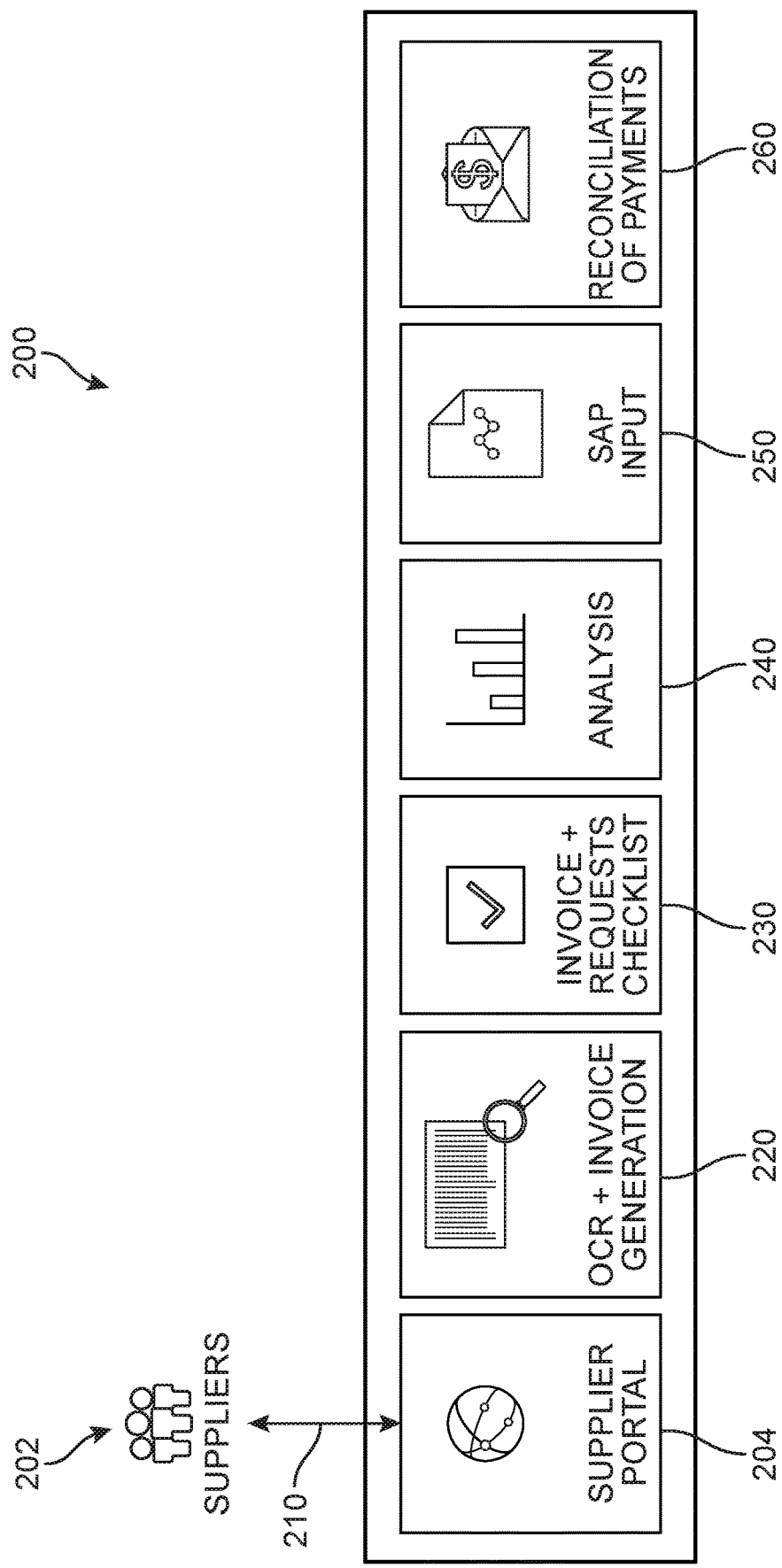
FIG. 2 is a schematic high-level flow diagram of an automated process for a payment processing platform, according to an embodiment.

FIG. 2 depicts a flow diagram representing an overview of an embodiment of a document processing platform ("platform") 200. In a first stage 210, suppliers 202 interact with the platform 200 via a user interface provided by the system. All payment records or other necessary documents can be submitted by the supplier via a supplier portal 220, as well as follow-up inquiries and submissions. In a second stage 220, the submitted documents are OCR'd and invoices for the documents are automatically generated by the system. In other words, at this stage, the system receives or otherwise generates or captures pertinent documents that typically include one or more financial transaction entries. These documents may be scanned copies of physical documents, such as paper receipts, or may be created as electronic documents, such as data files having a known digital document format such as comma-separately-values (.csv), portable-document-format (.pdf), spreadsheets, etc. Each document can be linked to the user's account, and converted into a string of characters. Additional information regarding the augmented OCR will be discussed with reference to FIG. 6 below.

In a third stage 230, the data included in the invoices and submissions are validated to ensure specific essential information has been recognized. Such validation inputs can include but are not limited to request types, supplier identity, borrower identity, nature of operation, or other data associated with or required by the government taxation system (e.g., Brazil's taxation system "Simples Nacional"). This information is processed and analyzed to verify the values match expected values in a fourth stage 240. In a fifth stage 250, SAP (Systems, Applications and Products) or other Enterprise Resource Planning (ERP) and data management programs will be utilized to generate data reports that will be input into the platform by bots, minimizing any impact on the client systems. The reports generated can include statements or records such as travel and expense reimbursement reports and requests, business activity statements, profit and loss reports, and/or tax summary reports. Finally, in a sixth stage 260, reports and other processed data is submitted to a payment reconciliation module, which can ensure payments are correctly processed, including identification of the payment basis, payments remittance, payment returns, and manual payments. The reconciliation stage matches and reconciles database entries and payment documents from multiple sources (e.g., bank accounts, credit card accounts, external entity accounting records, municipal records, etc.).

Figure 3:
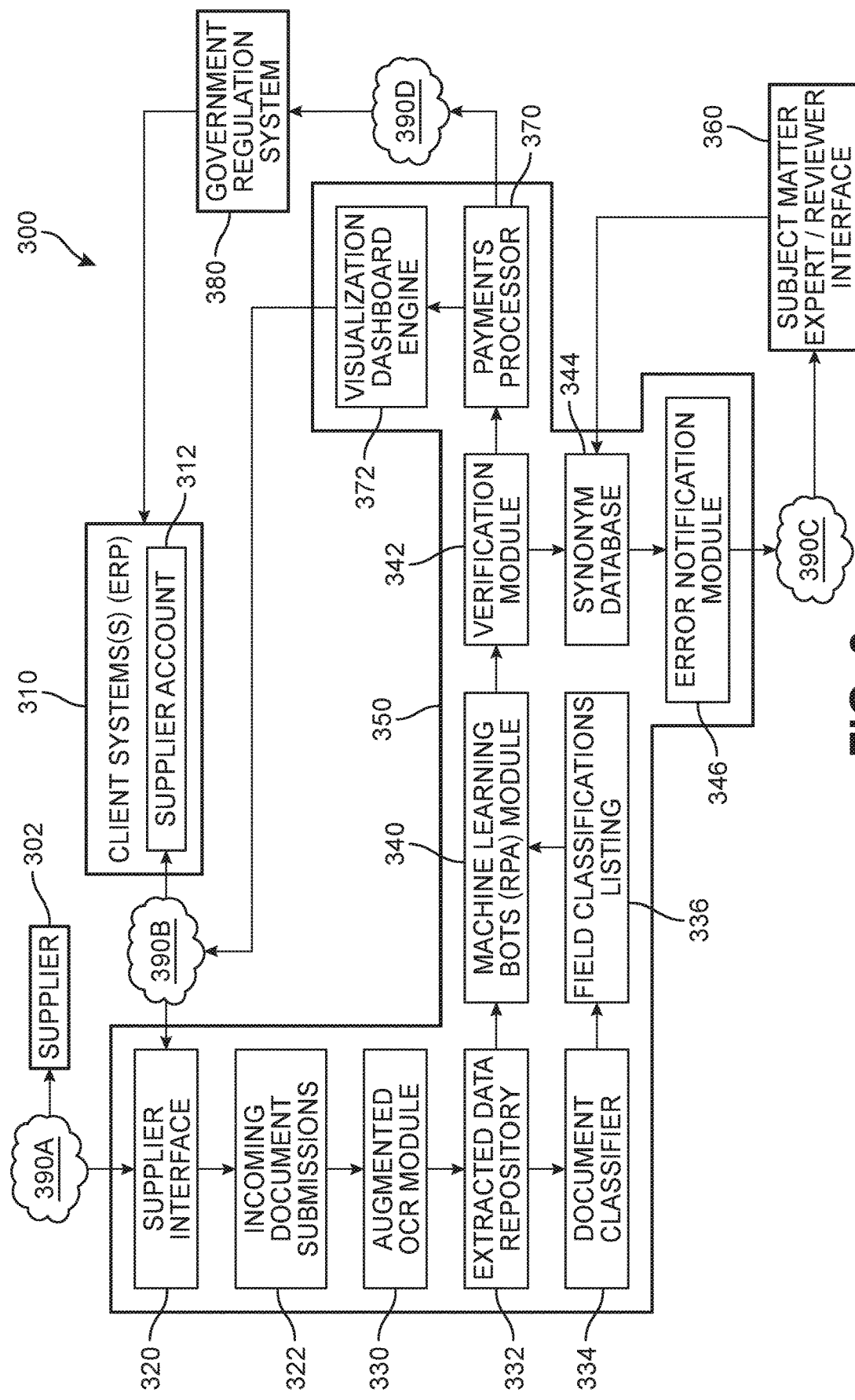
FIG. 3 is a schematic diagram of an embodiment of an architecture of an automated payment processing system.

Referring now to FIG. 3, one embodiment of an intelligent payment processing platform architecture ("architecture") 300 for automated electronic invoicing and bookkeeping configured to process electronic documents. The architecture 300 can includes a pre-existing client ERP system(s) 310 that may be further linked to a government compliance or other municipal regulatory system 380. Incoming documents ("documents") 302 are submitted by a supplier 302 via a supplier interface 320 for receipt by a document processing platform ("platform") 350 which serves as a main engine responsible for execution and control of the process flow. The ERP system 310, regulatory system 320, and platform 350 can each represent a server device or cluster of server devices coupled to a network (390A-D). The server devices can be physical servers, virtual servers, or a cloud-based server system within one or more datacenters. In one embodiment, the regulation system 320 is provided by a government financial or regulatory agency that calculates a tax for transactions performed within the system, or can be associated with a private, non-governmental organization (e.g., tax or accounting organization, geographical local authority, one of an educational, religious, sports, arts, etc.) that can be contracted to provide tax, accounting, or other financial payment services. Robotic automation provided by platform 350 interacts with the existing architecture (e.g., client system 310 and regulatory system 380) with no complex system integration required, and is used to automate workflow, infrastructure, and back office processes which are labor intensive, and emulates human execution of the repetitive processes using various application and systems.

As seen in FIG. 2, documents 302 are recognized and converted via augmented OCR module 330 to extract pertinent data. The incoming documents 302 can contain information which requires further processing that can be executed in the regulatory system 320 as well as information for classification in various categories in the client system 310 such as purchase order information, delivery information, goods movement information, or invoices, etc. For example, the platform may receive documents originating from various sources, and may process the documents, with an optical character recognition engine, to generate digitized documents. The platform may process the digitized documents, with a first machine learning model, to detect languages utilized in the digitized documents, and may process the digitized documents, in other languages that are different than a common language and with a second machine learning model, to translate the digitized documents, in the other languages, into the common language and to generate translated digitized documents. The electronic document platform may process the translated digitized documents and untranslated digitized documents, with a classification model, to generate classified documents, and may process the classified documents, with a third machine learning model, to generate extracted information from the classified documents. The electronic document platform may validate the extracted information based on business rules and to generate validated extracted information, and may generate a smart contract for a transaction based on the validated extracted information.

Data that is harvested by the OCR module 330 is sent to and stored in an extracted data repository 332. The repository 332 can for example utilize and search and analytics engine such as ElasticSearch, Solr, Lucene, MongoDB, Algolia, and Splunk, or other search and analytics engines, as well as batch analytics engines, data formatting, searching, analysis and visualization processors, data libraries, and cloud storage for data archival. Based on the received information, the type of document that has been submitted can be identified by a document classifier module 334, and the expected fields contained or included by this document type will be checked by reference to a field classifications listing 336 for that document type.

In other words, for each document type, which can vary widely depending on the ERP system 310 and regulatory system 380 and their operating parameters, different data fields may be expected. For example, some types of invoices may be expected to include fields including but not limited to Customer's Job Contact First Name, Customers Job Contact Last Name, Customer's Job Contact Phone, Customer's Job Contact Mobile, Customer's Job Contact Email Address, Customer's Job Address, Customer's Job Address (On a single line), Customer's Billing Address, Customer's Billing Address in Postal Format addressed to the Billing Contact, Current Status of Job (Quote/Work Order/Completed/Unsuccessful), Date job was marked as a Quote, Date job was marked as a Work Order, Job Description, Job Work Completed Details, Job Number, Date job was marked completed, Staff Member's name who marked job completed, Date job was marked unsuccessful, Customer's Billing Contact Last Name, Customer's Billing Contact First Name, Customer's Billing Contact Phone, Customer's Billing Contact Mobile, Customer's Billing Email Address, Job Purchase Order Number, Company Name, Company Email Address, Website address, Submission Date, Staff Members name who produced the invoice, Total price, Subtotal price, Total materials, Total labor, Tax total price (GST/VAT/etc.), Amount Paid by Customer, Total price less any amounts paid, Date payment for this job was processed, Staff Member's name who processed payment, Payment Method, Date invoice is due, GPS Longitude of service site, GPS Latitude of service site, Description of service/good/material, Material/Service/Good Code, Material/Service Name, Quantity, Item Tax Type, Per Item Cost, Per Item Price, Per Item Price–Excluding Taxes, Total Price for this item (Quantity× Per Item Price}–Excluding Taxes, Total Price for this item (Quantity×Per Item Price)–Including Taxes, etc.

While some of these fields may be commonly included in other document types, many of these fields will also be omitted in other document types, and different fields may be included in other document types. Thus, for each document type, specific fields may be included that may be absent for other document types. In addition, while a first data value may be acceptable for entry in a first field included in a first document type, the same first field in a second document type may not consider that same first data value to be acceptable, and may instead require a different format or answer. More specifically, while a first plurality of fields and corresponding data values may be expected for the Brazilian NF-e type invoice document, a different plurality of fields and corresponding data values may be expected for a non-Brazilian invoice document, or a non-NF-e Brazilian invoice. The classification of a document thus becomes important when the RPA bot is determining whether the fields shown have been correctly filled. In other embodiments, other classifications can be used to optimize which values are considered acceptable for a particular field, such as the supplier's country of origin, the type of good or service that is invoiced, and the requirements of the specific municipality for which the invoices are being processed.

The extracted data will be processed by machine learning bots of a machine learning module 340 configured for use with the specified document type. The machine learning module 340 may implement an artificial intelligence service that will be trained to detect any anomaly in the collected data based on the classification of the type of document. An example artificial intelligence service includes TensorFlow provided by Google™, Inc. of Mountain View, Calif. In some examples, TensorFlow can be described as an open source software library for numerical computation using data flow graphs. However, other deep learning application programming interfaces (API) that implement a known machine learning or deep learning technique may also be used, such as but not limited to GraphDB, MLpack, Darknet, CatBoost, Training Mule, Cloud AutoML, Theano, Keras, Torch, Infer.NET, SciKit Learn, Apache Spark MLlib, etc.

A verification module 342 works in concert with the machine learning bots to ensure that all of the values that have been recognized and stored in the repository 332 match expected values for their field. This process can occur with reference to a synonym database 344 which is a continuously updated learning module that includes all acceptable values for each field (see FIG. 7, as well as example invoice fields listed above). If the verification module 342 determines that any value is incorrect or otherwise appears to represent an inconsistent expression, an error will be generated by an error notification module 346, which can alert a reviewer via a reviewer interface 360. Identified actions and events are automatically transmitted to and displayed to an operations team member assigned to monitor the system. The reviewer will be responsible for reviewing and approving/confirming (or declining) the recommended actions. The corrective actions will thus be pending execution until approved by an operator (or referred to another SME) who can address the issue by either submitting a request for correction to the supplier, correcting the value themselves, or confirming that the two values are actually synonymous. If the two values are determined to actually represent the same data, the synonym database 344 will be updated to reflect this decision. In such a way, the machine learning module 340 can engage in a continuous or substantially continuous and automated training cycle in which learning occurs with each processed document.

In some embodiments, the full set of data is mapped, for example by use of a data mapping module that converts the data from the submitted form to the proper data format. In one embodiment, the data mapping module can be automatically applied to the extracted text to map their various types of data (e.g., accounts receivable data, such as bill account and bill data) to the data required by the platform for the selected document type. For example, a biller's accounts receivable system might output a file containing information for a particular business account and bill data in CSV file format. The data mapping module receives the uploaded CSV file and maps each data element in the CSV file to the appropriate required data field (e.g., billing account number, bill number, customer name, etc.

Once the data has been processed and approved, a payments processor 370 can automatically generate an output appropriate for the given regulatory system 380 and recording by the client system 310. Furthermore, the metrics and other data stored by repository 332 and payments processor 370 may be manipulated, analyzed and displayed via a tool and/or user interface. The tool and/or user interface may allow and/or provide for a system administrator to query and alert on payment decisions and create a dashboard interface to visually display the data and metrics (also referred to herein as a maintenance dashboard). In some embodiments, the data is analyzed and visually displayed using an open source software platform to allow an administrator or other support end-users to query and generate alerts and notifications on specific metrics and to create dashboards to visually display time series data (see examples FIGS. 8-10 below). The reports may be chart reports, dashboards, or other reports. An example of an open source software platform for time series analytics and visualization is Grafana, which is provided by GrafanaLabs. Other dashboards such as Guidewire, JSON, Llamasoft, Domo, and Tableau, or others known in the art may be implemented. In some embodiments, the analytics and visualization platform is hosted in the cloud, while in other embodiments the analytics and visualization platform is hosted locally on a server.

For purposes of this disclosure, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Figure 4:
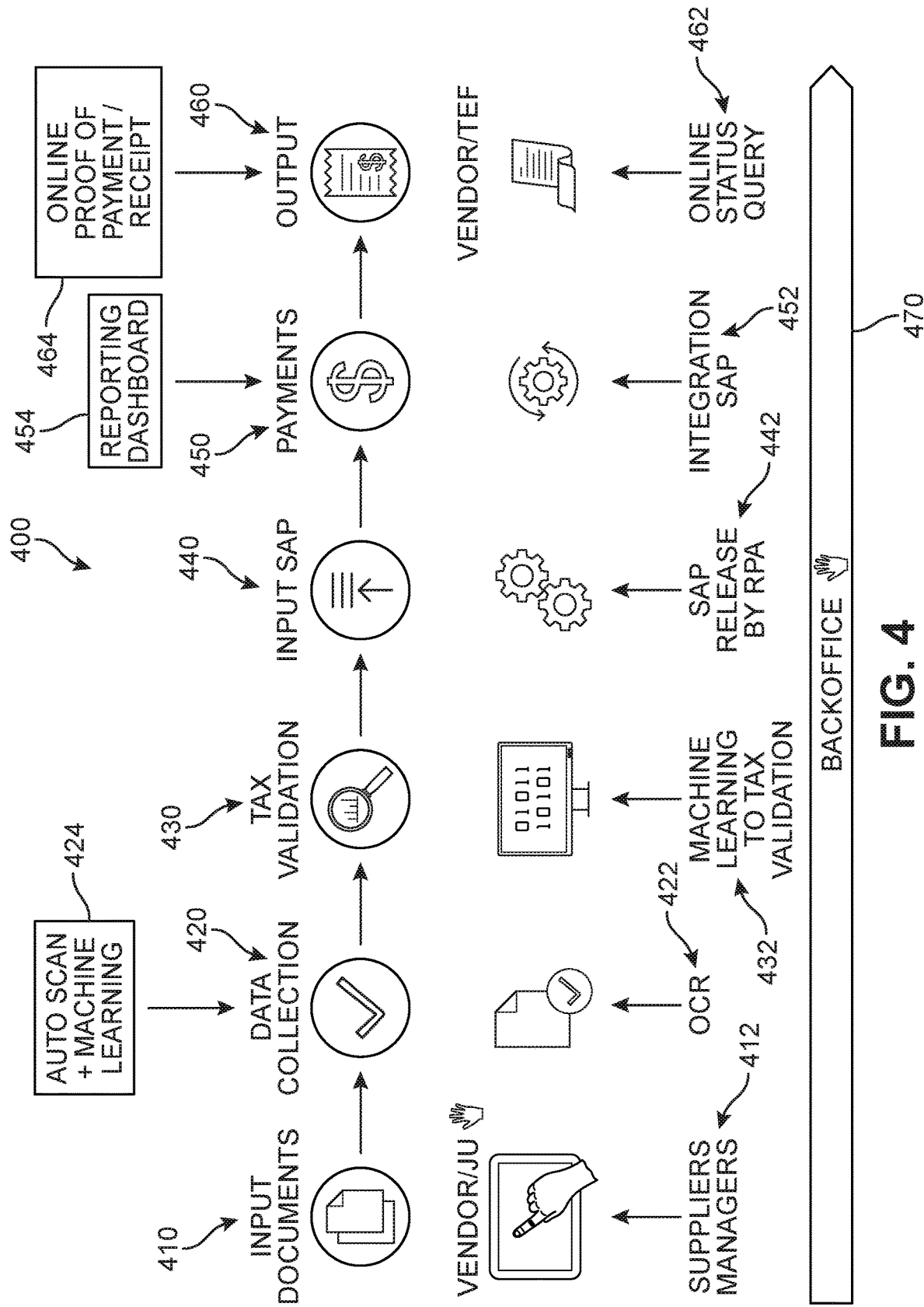
FIG. 4 is a schematic flow diagram of an automated process for a payment processing platform, according to an embodiment.

Referring now to FIG. 4, a diagram representing a more detailed view of an embodiment of a document processing platform ("platform") event flow 400 is provided. In a first stage 410, documents are input by suppliers 412 via a vendor interface, which represents the only manual step of the process (see hand icon). These documents are automatically scanned and data values extracted in a second stage 410 by recognition algorithms 422 augmented by machine learning algorithms 424. The harvested data is validated in a third stage 430, also supported by machine learning algorithms 432. RPA bots 442 process the validated data with SAP or Enterprise Resource Planning (ERP) systems in a fourth stage 440, and the resultant information is used to process payments in a fifth stage 450 via integration with SAP system 452. The processed data can be viewed and/or interacted with by end-users via a reporting dashboard 454. Finally, in a sixth stage 460, requests or queries 462 regarding the submission, for example by vendors, can be obtained as output corresponding to proof of payments or receipts 464.

Figure 5:
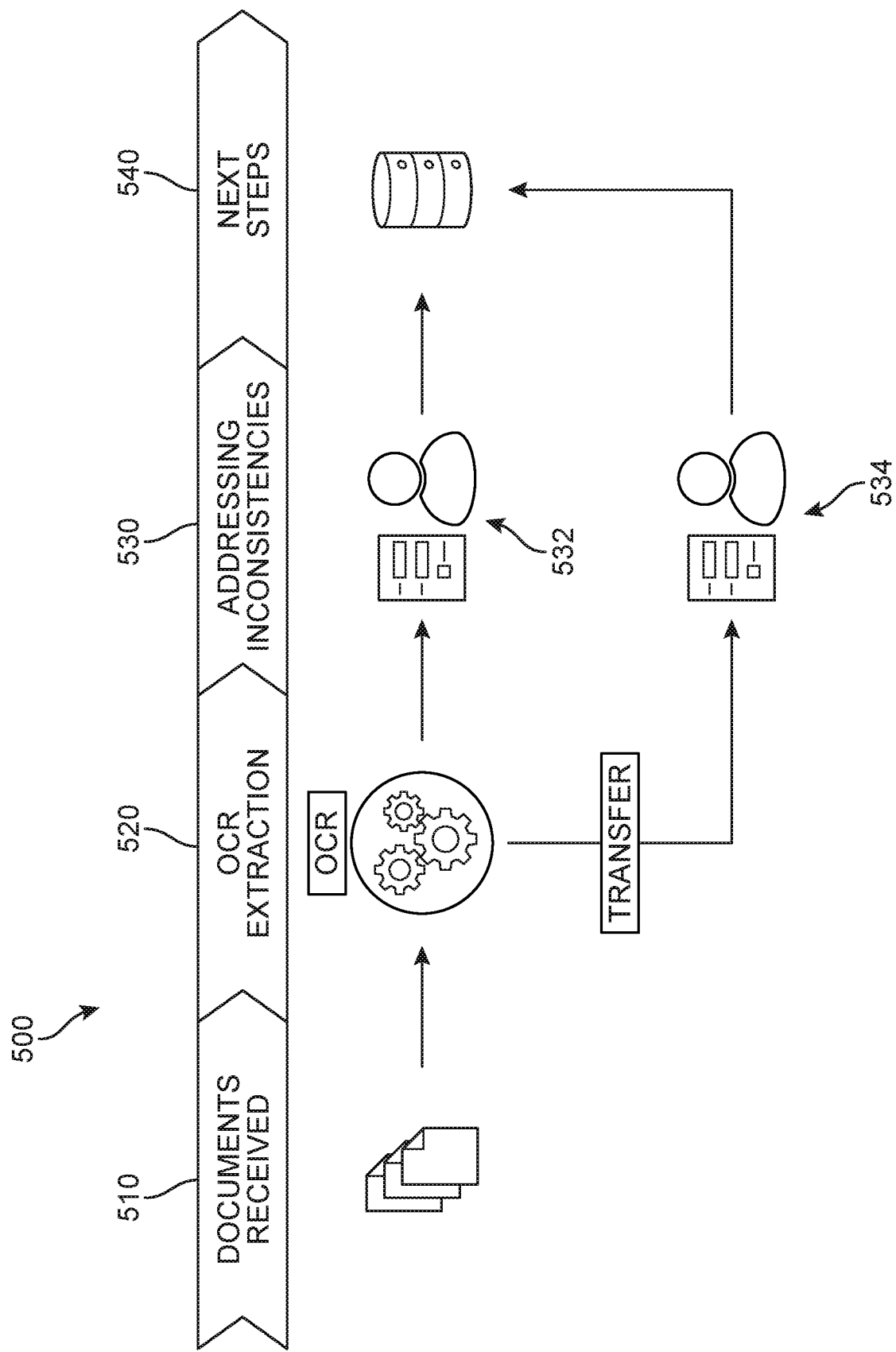
FIG. 5 is a schematic flow diagram of a data extraction and review process, according to an embodiment.

FIGS. 5 and 6 depict two flow diagrams representing aspects of the character recognition process. In FIG. 5, a first process 500 includes a first stage 510 in which documents are received by the platform. In other words, the platform receives a file such as a scanned image of a paper transaction document or a data file of transactions. A second stage 520 includes determining whether to apply OCR to the received documents. The platform will route the file for processing based on its type. If it is determined that a scanned paper document was received, then an optical character recognition (OCR) process is carried out. However, if the file received was an electronic document having a known digital document format, such as a Microsoft™ Word document or other non-image document, then conversion of the file to character string is carried out. For digitized images of documents, OCR is applied to the digitized image or the conversion of other non-data file electronic document formats (such as .pdf, RTF, .txt, etc.) to a single character string containing all characters, spaces and line breaks or carriage returns in the document (unique special characters may be inserted for each space, line break, etc.) which can be recorded in association with all information captured on receipt of the original file. In cases in which the extraction results in inconsistencies (third stage 530) a Back-Office operator 532 may validate and supplement extracted data from documents, making the extracted data fit for the next stages 540 of the process. In some embodiments, the data can alternatively be transferred for validation to an external system and/or operator 534 responsible for managing the platform.

Further information regarding the augmented OCR process is discussed with reference to a second process 600 of FIG. 6. In a first stage 610, the received documents are classified and separated in anticipation of extraction. In a second stage 620, the documents are digitized and pertinent data is extracted. Virtually all documents will have a number of shared features, such as common reoccurring words (or character strings) and patterns of presentation. The OCR module extracts and generates a complete character string for each document that can characterize entries and the layout displayed on the document. Each complete character string is analyzed to identify known transaction character strings and transaction data strings associated with each identified transaction character string. Each complete character string is then analyzed to determine if the document represents more than one financial event. Finally, the data is stored in a database for performing subsequent accounting operations.

In cases where the extraction fails or includes an error, unexpected value, or other inconsistency that reflects the OCR has not been effective, AI and ML (see FIG. 7) will be utilized to further process failed documents in a third stage 630. In other words, AI and ML will learn to recognize and correct errors that have been previously detected or tagged and apply this learning forward to continually optimize the process. The data is then validated and the workflow approved in a fourth stage 640, for final approval and review in a fifth stage 650.

In some embodiments, as mentioned earlier, a service bot of the platform may process the digitized documents to detect data that has been entered for each field. In some embodiments, a machine learning model is used to detect data included in the digitized documents, including but not limited to a Google™ API machine learning model, a Microsoft™ Azure API machine learning model, an IBM™ Bluemix API machine learning model, a classifier machine learning model, etc. In some embodiments, the platform may perform a training operation on the machine learning model with the digitized documents or with information that includes different inputs. For example, the platform may separate the digitized documents into a training set, a validation set, a test set, and so forth. In some implementations, the platform may train the machine learning model using, for example, an unsupervised training procedure and based on the training set of the digitized documents. For example, the platform may perform dimensionality reduction to reduce the digitized documents to a minimum feature set, thereby reducing resources (e.g., processing resources, memory resources, and/or the like) to train the machine learning model, and may apply a classification technique to the minimum feature set. Additionally, or alternatively, the platform may use a support vector machine (SVM) classifier technique to generate a non-linear boundary between data points in the training set. In this case, the non-linear boundary is used to classify test data into a particular class.

Additionally, or alternatively, the platform may train the machine learning model using a supervised training procedure that includes receiving input to the machine learning model from a subject matter expert or other operator, which may reduce an amount of time, an amount of processing resources, and/or the like to train the machine learning model of activity automatability relative to an unsupervised training procedure. In some embodiments, the platform may use one or more other model training techniques, such as a neural network technique, a latent semantic indexing technique, and/or the like. For example, the platform may perform an artificial neural network processing technique (e.g., using a two-layer feedforward neural network architecture, a three-layer feedforward neural network architecture, and/or the like) to perform pattern recognition with regard to patterns of whether a document includes a particular response type or input value. In this case, using the artificial neural network processing technique may improve an accuracy of the trained machine learning model generated by the platform by being more robust to noisy, imprecise, or incomplete data, and by enabling the electronic document platform to detect patterns and/or trends undetectable to human analysts or systems using less complex techniques. In some embodiments, the machine learning model may include a support vector machine model, a linear regression model, a logistic regression model, a naive Bayes model, a linear discriminant analysis model, a decision tree model, a k-nearest neighbor model, a neural network model, and/or the like.

For purposes of clarity, some examples of the data fields specifically processed by the machine learning bot(s) are presented with reference to FIG. 7. It should be understood that the list of fields in table 700 is shown for illustrative purposes only, and alternate and/or additional fields may be targeted by the machine learning bots depending on a variety of factors such as but not limited to the document type (see FIG. 2). The table 700 includes a listing of key fields that may represent a sample of the information extracted from incoming documents, and used by the platform to determine if the expected data has been received. As shown in FIG. 7, these fields include (a) invoice number; (b) invoice issue date; (c) supplier's identification number issued by a regulatory body (e.g., the national registry of legal entities number issued to Brazilian companies by the Department of Federal Revenue of Brazil); (d) supplier's corporate name; (e) supplier address; (f) supplier address; (g) supplier country; (h) supplier state; (i) borrower's corporate name; (j) borrower's identification number issued by a regulatory body; (k) borrower address; (l) borrower country; (m) borrower state; (n) services breakdown (e.g., order number, item number); (o) total invoice amount; (p) description of the nature of the operation; and (q) tax amount and rate. The self-learning aspect works with the verification of the values for these fields sent in the invoices by the suppliers that are compared with the "synonyms" for data in these fields that have already been registered in the Machine Learning synonym database. If the value passed does not exist as a synonym, then the bot registers a new synonym for the field.

Simply for purposes of illustration, one possible iteration of this process may be described. Generally, aspects of the supplier address, such as the street, city, postal code, etc. will need to be validated. In one example, the system compares the inputted city name extracted from an invoice to the city name that was registered by the supplier in their own ERP. If the text of the two terms differs, the ML bot can automatically determine if the two names are actually referring to the same city (i.e., the two are synonymous). For example, if the invoice includes the city name "S. Jose dos Campos" while the ERP Registered City is identified as "Sao Jose dos Campos", the system may determine there is an inconsistency based on a simple text comparison. In this case, the first time an inconsistency of this type was generated, the issue will be tagged for review by a human operator. Once the invoice is finalized in the system, the machine learning bot detects that there was a manual adjustment for this field and registers a new synonym for this specific city in a database. In other words, a new synonym will be registered in the Cities table for each manual adjustment for this field. Thereafter, when a document includes the city name value "S. Jose dos Campos", an error will no longer be generated because the verification bot will match the name of the city in the table to the synonym that had been previously registered by the machine learning bot.

Furthermore, tax validation can also be performed using machine learning techniques. As an example, the field labeled in FIG. 7 as "Description of the Nature of Operation" is processed by a machine learning bot. The registered or previously validated "standard" data can include, for example, for Operation Nature Code 10.02 a corresponding description "Agency, brokerage or intermediation of securities in general, securities and any contracts". If an invoice is submitted by a supplier in which the Operation Nature Code is 10.02 and corresponding description is "SECURITIES BROKERAGE AGENCY, BROKERAGE OR INTERMEDIATION OF SECURITIES IN GENERAL, SECURITIES", an inconsistency may be noted when the two sets of values are compared. However, if the second (supplier) value is reviewed and verified as also being legitimate or otherwise acceptable, a new synonym will be registered under the Nature of Operation 10.02. In other words, the value of the Description Nature of Operation sent by the supplier will be registered as a new synonym for Nature of Operation 10.02 in the machine learning database. In this case, the Tax Analysis Robot (Tax Validation) has the prerequisite to recognize the nature of the invoice operation in order to perform the tax validations correctly. By applying machine learning bots to the workflow, this apparently conflicting information can be readily incorporated and used in subsequent transactions.

Figure 8:
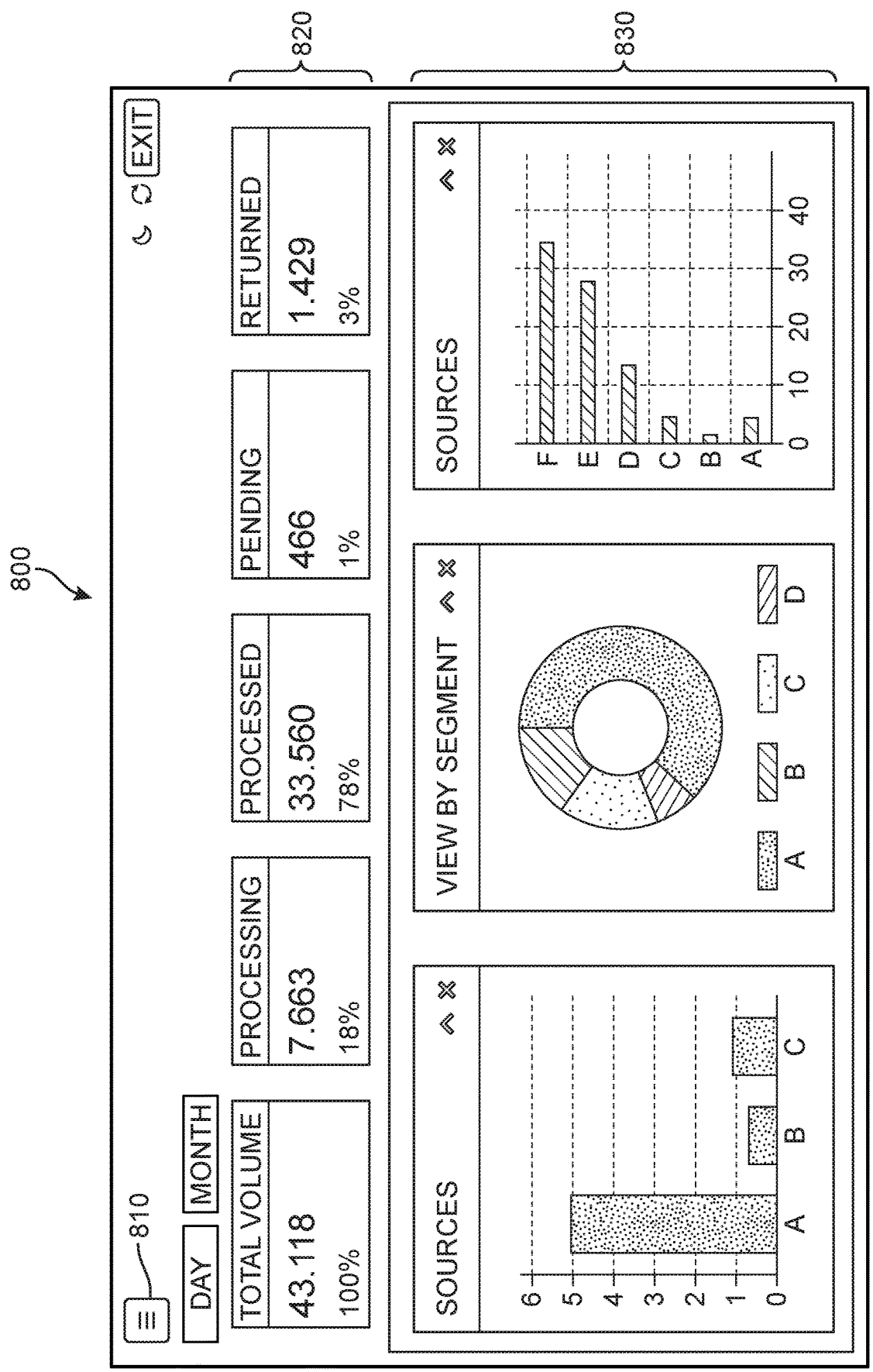
FIG. 8 is an example of a visualization dashboard, according to an embodiment.

One example of a visualization dashboard user interface ("dashboard") 800 is presented now in FIG. 8. It should be understood that the dashboard 800 is only one possible depiction of a user interface that may be offered to the end-user, and in other embodiments, any variation in presentation style, options, menus, and graphical depictions can be used, including interfaces customized by the end-user to display the desired information. A Settings option 810 can also be displayed to allow the end-user to create or modify the account. In addition, a number of interface layer options may be provided. For example, a navigation menu can allow the user to switch to an Overview or landing page that presents a brief summary of the selected processing session(s) along with tasks and alerts. For example, this page may include details such as the payment details, invoices received, etc. The current view shown in FIG. 8 is an analytics overview, and includes a metrics summary 820 panel along the upper region of the dashboard 800 and a reports summary 830 which can present a summary of various aspects of the process. Such metrics and reports can present big-picture views of data such as document sources (e.g., by supplier, industry, date, etc.), volume, number of invoices processed by industry, and other pertinent key performance indicators (KPIs) for payment management, such as those invoices that are "In Process", "Processed", the number of "Pending" and the releases that were "Returned". All of these numbers are updated in real time via databases, RPAs, and artificial intelligence. In some embodiments, some or all of these reports can be presented in graphical form, such as bar graphs, line graphs, pie charts, cartesian graphs, percent complete indicators, etc. This dashboard 800 may represent the front-end access to the platform.

Figure 10:
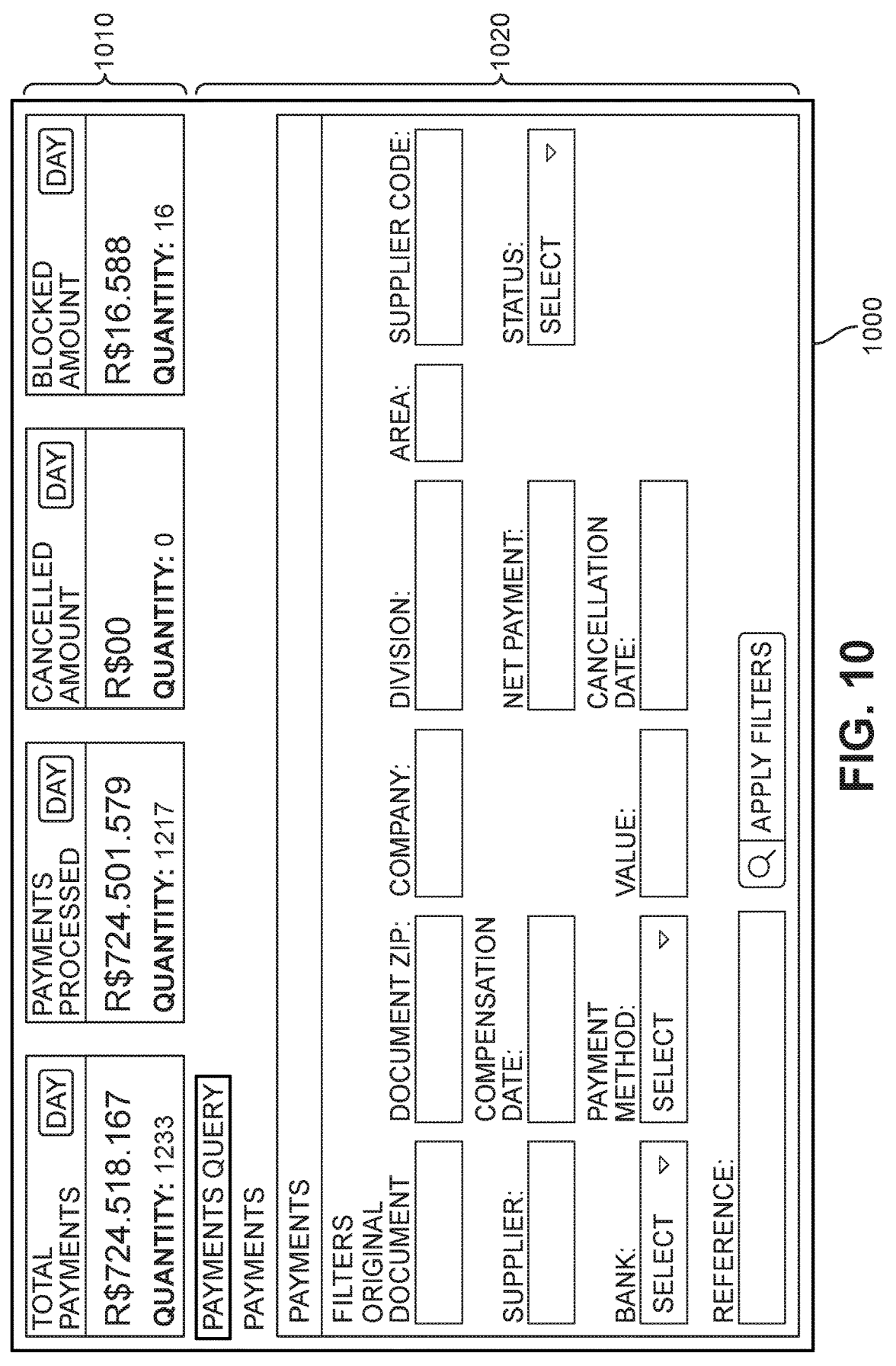

FIGS. 9 and 10 depicts two examples of back-office access interfaces. In FIG. 9, a checklist interface 900 is shown that is configured to offer an operator to analyze inconsistencies noted in systemic validation. For example, an operator can readily access specific types of data based on a plurality of filters 910 such as record date, invoice type, issue type, date of last status update, and payment note value. Items pointed out in the systemic validation will be presented in this screen. Executing the search can trigger a display 920 of any items matching the selected filters. In some embodiments, when selecting a line item, the details for that record will also be displayed on the same screen with errors or nonconformities identified and, in some embodiments, offer options to address or clear these errors. For example, a record can be tagged with various icons to offer guidance to operators in back-office management such as a first icon that signals a document includes non-compliant data subject to a return to the supplier, and a second icon that signals that the document includes non-compliant data that is pending review. Additional options can be offered that can, for example, be used to trigger a display of the digitized payment document image, or enable verification of tax withholdings. In some embodiments, a documentation option can be provided that opens the image of the consultation made on the local governmental website for a submission associated with sources outside the local governmental municipality.

FIG. 10 depicts an example of a payment inquiry interface 1000 for review of payment receipts that can summarize various data 1010 (e.g., including total payments by date, total payments processed by date, cancelled amounts by date, blocked amounts by date, etc.). Various filters as shown in filter panel 1020 can also be applied to isolate specific types of payment information. Vouchers are saved by bots and made available on the platform with all information linked to the ERP client system. In some embodiments, account operators and third-party users may access this interface to review the status of their submissions, as well as some or all of the documents that have been submitted and processed and/or generated by the system. For example, as noted earlier, the payment processing platform can be integrated with SAP or other Enterprise Resource Planning (ERP) systems, as well as with bank remittance and payment return files. This integration enables the platform to provide copies of payment receipts or invoices to the users via the convenient online interface tool, which may be printed or saved for the user's reference and financial records. Thus, the interface is designed to not only allow users to verify that payment(s) has been made, but also obtain proof of payment of their invoice.

Other embodiments can include back-office access for enabling the operator to validate and supplement extracted data from documents in the automatic OCR process, making the extracted data fit for the next stages of the process. Using tools provided by this interface, the operator can access one of the data completion-pending items after OCR extraction.

For example, the protocol or ID number for the document can be shown (e.g., highlighted in orange) and a panel can display some or all of the document for that protocol number. In some embodiments, the fields for filling in the document data are also displayed, according to the document type (e.g., Service Invoices, etc.). Thus, the fields pertinent to the detected document type will be presented. While the document type is automatically determined by the OCR process (see FIG. 3), the operator is provided the option to change the document type if so desired by manually changing the "type" field. Once the fields have been reviewed, the bot or the user can confirm the data submission.

In different embodiments, a tax analysis back-office interface can also or alternatively include options to allow an operator to enter withholding information that has inconsistencies and/or has not been entered correctly. For example, options can be provided for automatically or manually managing the service taxes of invoices, enable the maintenance of rules and regulations, permit the user to view the taxes withheld by a selected nature of operation, to register the name of the City Hall or other municipality website link for the system to refer to (e.g., the Register of Other Municipalities Service Providers (CEPOM) is a registry in which providers sign up to serve customers located in other cities in Brazil), to query all documents in the context of each of the processing steps, to extract all documents for a specific processing stage, to extract all documents with inconsistencies of a particular type, and/or view the status of integration of the platform with the client's system.

Figure 11:
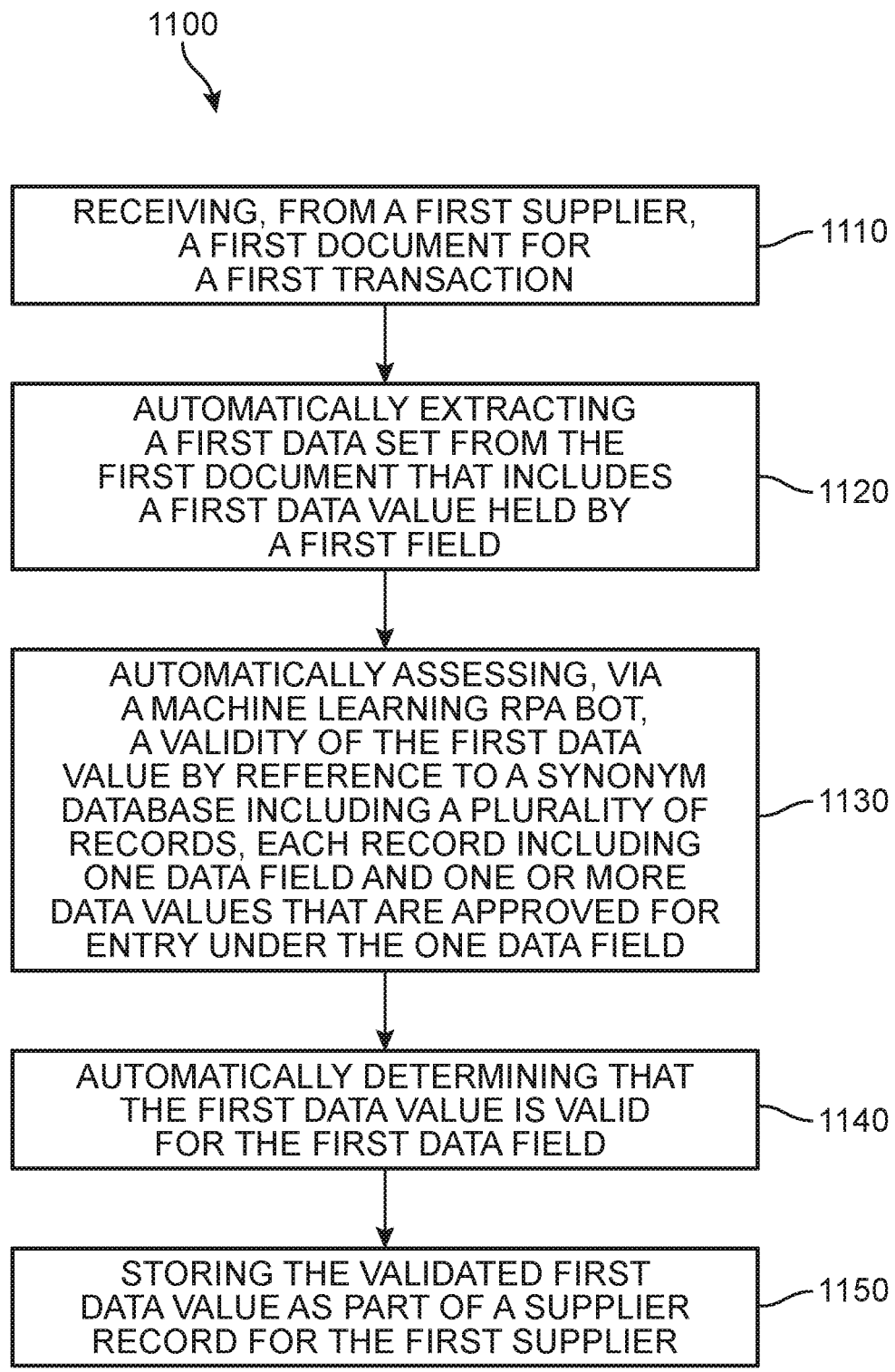
FIG. 11 is a flow chart depicting a method of automating payment processing, according to an embodiment.

FIG. 11 is a flow chart illustrating an embodiment of a method 1100 automating the processing of payment documents. As shown in FIG. 11, a first step 1110 of the method 1100 includes receiving, from a first supplier, a first document for a first transaction, and a second step 1120 of automatically extracting a first data set from the first document, where the first data set includes at least a first data value held by a first field. A third step 1130 includes automatically assessing, via a machine learning RPA bot, a validity of the first data value by reference to a synonym database including a plurality of records, each record including one data field and one or more data values that are approved for entry under the one data field. Furthermore, a fourth step 1140 includes automatically determining that the first data value is valid for the first data field, and a fifth step 1150 includes storing the validated first data value as part of a supplier record for the first supplier.

In other embodiments, the method may include additional steps or aspects. For example, the method can further include a step of transmitting the validated first data value to an external enterprise resource planning (ERP) system associated with the first supplier. In another example, the first document can further include a plurality of data sets, and the method may then also include mapping each data value of each of the data sets to a corresponding data field detected in the received first document and storing the mapped data. In some embodiments, the method also includes steps of validating each of the mapped data values, and automatically transmitting the mapped data values to an external municipal computing system.

In one embodiment, the method may also involve a step of displaying, via a visualization dashboard, information including the validated first data value. In another example, the method can further include steps of automatically extracting a second data set from the first document, the second data set including a second data value held by a second field, automatically assessing, via a machine learning RPA bot, a validity of the second data value by reference to the synonym database, automatically determining that the second data value is an invalid entry for the second data field, and automatically generating, for review by an operator, a message indicating the second data value is invalid. In some embodiments, the method can then also include receiving, from the operator, an input validating the second data value for the second data field and, in response to receiving this input, automatically updating, at a first time, the synonym database to include the second data value as an approved entry for the second data field.

In some cases, the method may further include steps of receiving, from a second supplier, a second document, automatically extracting a third data set from the second document, the third data set including a third data value held by a third field, wherein the third data value is the same as the second data value and the third field is the same as the second field, automatically assessing, via a machine learning RPA bot, a validity of the third data value by reference to the synonym database, at a second time after the first time, and automatically determining that the third data value is a valid entry for the third data field based on the inclusion of the second data value in the synonym database. In one example, each record of the synonym database is mapped to a specific document type. In some embodiments, the method can then also include automatically determining that the first document is of a first document type based on the first data set, where the first data value is valid for the first data field only for the first document type.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random-access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of automating processing of payment documents, the method comprising:
receiving, from a first supplier, a first document for a first transaction;
automatically extracting a first data set from the first document, the first data set including at least a first data value held by a first data field;
automatically assessing, via a machine learning robotic process automation (RPA) bot, a validity of the first data value by reference to a synonym database including a first record, the first record including a second data field and one or more data values that are approved for entry under the second data field, the one or more data values including a second data value;
automatically determining that the first data value is valid for the first data field by confirming that the first data value matches the second data value in the first record; and
storing the validated first data value as part of a supplier record for the first supplier.

2. The method of claim 1, further comprising transmitting the validated first data value to an external enterprise resource planning (ERP) system associated with the first supplier.

3. The method of claim 1, wherein the first document further includes a plurality of data sets, and the method further comprises mapping each data value of each of the data sets to a corresponding data field detected in the received first document and storing the mapped data.

4. The method of claim 3, further comprising:
validating each of the mapped data values; and
automatically transmitting the mapped data values to an external municipal computing system.

5. The method of claim 1, further comprising displaying, via a visualization dashboard, information including the validated first data value.

6. The method of claim 1, further comprising:
automatically extracting a second data set from the first document, the second data set including the second data value held by the second data field;
automatically assessing, via a machine learning RPA bot, a validity of the second data value by reference to the synonym database;
automatically determining that the second data value is an invalid entry for the second data field; and
automatically generating, for review by an operator, a message indicating the second data value is invalid.

7. The method of claim 6, further comprising:
receiving, from the operator, an input validating the second data value for the second data field;
automatically updating, at a first time, the synonym database to include the second data value as an approved entry for the second data field.

8. The method of claim 7, further comprising:
receiving, from a second supplier, a second document;
automatically extracting a third data set from the second document, the third data set including a third data value held by a third data field, wherein the third data value is the same as the second data value and the third data field is the same as the second data field;
automatically assessing, via a machine learning RPA bot, a validity of the third data value by reference to the synonym database, at a second time after the first time; and
automatically determining that the third data value is a valid entry for the third data field based on the inclusion of the second data value in the synonym database.

9. The method of claim 1, wherein the first data field is one of an invoice number, invoice issue date, identification number, corporate name, address, country, state, order number, item number, total invoice amount, tax amount, and tax rate.

10. The method of claim 1, further comprising automatically determining that the first document is of a first document type based on the first data set, and wherein the first data value is valid for the first data field only for the first document type.

11. A system of automating processing of payment documents, the system comprising:
a processor;
machine-readable media including instructions which, when executed by the processor, cause the processor to:
receive, from a first supplier, a first document for a first transaction;
automatically extract a first data set from the first document, the first data set including at least a first data value held by a first data field;
automatically assess, via a machine learning robotic process automation (RPA) bot, a validity of the first data value by reference to a synonym database including a first record, the first record including a second data field and one or more data values that are approved for entry under the second data field, the one or more data values including a second data value;
automatically determine that the first data value is valid for the first data field by confirming that the first data value matches the second data value in the first record; and
store the validated first data value as part of a supplier record for the first supplier.

12. The system of claim 11, wherein the instructions further cause the processor to transmit the validated first data value to an external enterprise resource planning (ERP) system associated with the first supplier.

13. The system of claim 11, wherein the first document further includes a plurality of data sets, and the instructions further cause the processor to map each data value of each of the data sets to a corresponding data field detected in the received first document and storing the mapped data.

14. The system of claim 13, wherein the instructions further cause the processor to:
validate each of the mapped data values; and
automatically transmit the mapped data values to an external municipal computing system.

15. The system of claim 11, wherein the instructions further cause the processor to display, via a visualization dashboard, information including the validated first data value.

16. The system of claim 11, wherein the instructions further cause the processor to:
automatically extract a second data set from the first document, the second data set including the second data value held by the second data field;
automatically assess, via a machine learning RPA bot, a validity of the second data value by reference to the synonym database;

automatically determine that the second data value is an invalid entry for the second data field; and automatically generate, for review by an operator, a message indicating the second data value is invalid.

17. The system of claim 16, wherein the instructions further cause the processor to:

receive, from the operator, an input validating the second data value for the second data field;

automatically update, at a first time, the synonym database to include the second data value as an approved entry for the second data field.

18. The system of claim 17, wherein the instructions further cause the processor to:

receive, from a second supplier, a second document;

automatically extract a third data set from the second document, the third data set including a third data value held by a third data field, wherein the third data value is the same as the second data value and the third data field is the same as the second data field;

automatically assess, via a machine learning RPA bot, a validity of the third data value by reference to the synonym database, at a second time after the first time; and automatically determine that the third data value is a valid entry for the third data field based on the inclusion of the second data value in the synonym database.

19. The system of claim 11, wherein the instructions further cause the processor to process the first document before extraction of the first data set by detecting a first language utilized in the first document and translating, by a first machine learning model, the first language to a second language.

20. A system comprising one or more computers and one or more storage devices storing instructions that are operable, when executed by the one or more computers, to cause the one or more computers to:

receive, from a first supplier, a first document for a first transaction;

automatically extract a first data set from the first document, the first data set including at least a first data value held by a first data field;

automatically assess, via a machine learning robotic process automation (RPA) bot, a validity of the first data value by reference to a synonym database including a first record, the first record including a second data field and one or more data values that are approved for entry under the second data field, the one or more data values including a second data value;

automatically determine that the first data value is valid for the first data field by confirming that the first data value matches the second data value in the first record; and store the validated first data value as part of a supplier record for the first supplier.

* * * * *